UNITED STATES PATENT OFFICE.

ELMYR A. LAUGHLIN, OF OREGON, ILLINOIS.

CAR MOUNTING.

1,402,625.   Specification of Letters Patent.   Patented Jan. 3, 1922.

Application filed November 26, 1921. Serial No. 517,855.

*To all whom it may concern:*

Be it known that I, ELMYR A. LAUGHLIN, a citizen of the United States, and a resident of the city of Oregon, county of Ogle, and State of Illinois, have invented certain new and useful Improvements in Car Mountings, of which the following is a specification.

My invention relates to improvements in car mountings and has for its object the provision of an improved car mounting so constructed and arranged as to automatically tend to keep the truck on the rails when the car tilts.

Other objects will appear hereinafter.

The invention consists in the combinations and arranegments of parts hereinafter described and claimed.

Figure 1:
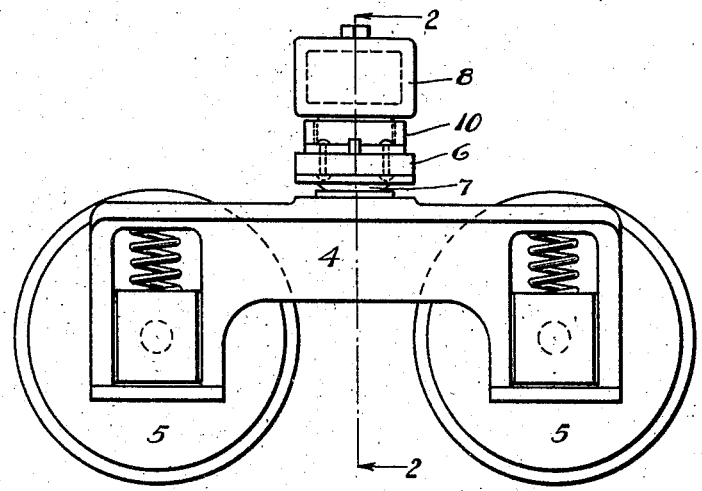

The invention will be best understood by reference to the accompanying drawings forming a part of this specification, and in which, Fig. 1 is a side view of a truck constructed in accordance with the invention.

Figure 2:
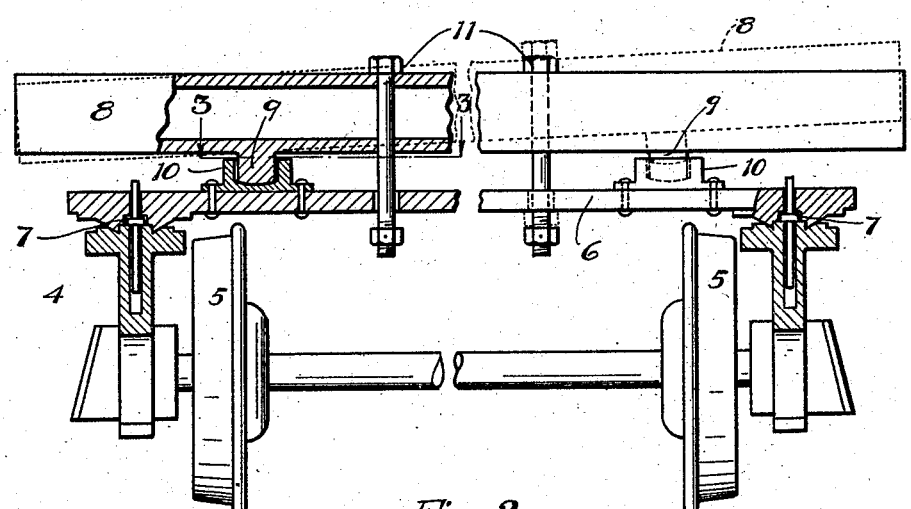

Fig. 2, an end view thereof shown partially in section, and

Figure 3:
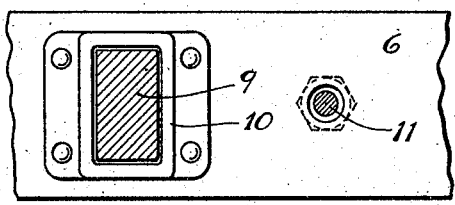

Fig. 3, a section taken substantially on line 3—3 of Fig. 2.

The preferred form of construction, as illustrated in the drawings, comprises a truck 4 of any usual or desired construction mounted upon the usual flanged wheels 5 to run upon the railroad track in the usual way.

A truck bolster 6 is arranged substantially centrally across the top of said truck and is given pivotal bearings 7 thereon at each end and outside of the wheels thereof, said pivotal bearings being provided at the top of the usual side frame of the truck. A car body bolster 8 is arranged above the truck bolster 6 and is provided with bearing lugs or blocks 9 loosely resting in box-like bearing mountings 10 on the bolster 6. The bolster 8 is further connected with the bolster 6 by means of one or more bolts 11 capable of free vertical movement in the bolster 6, and whereby free tilting of the car in operation is permitted.

It will be observed that the bearings 9—10 are located inside of the bearings 7 substantially over but slightly inside the wheels 5. By this arrangement when the car and body bolster 8 tilt, as indicated by dotted lines in Fig. 2, the entire weight of that end of the car is thrown upon the left-hand bearing 9—10, as shown in Fig. 2, and whereby the effective weight is applied inside of the corresponding bearing 7 and inside of the corresponding wheel 5, thus converting the bolster 6 into a lever pressing downwardly upon the opposite bearing 7, and thus tending to hold the opposite wheels 5 in engagement with the corresponding rail to prevent derailment of the car. The specific form and arrangement of parts is a simple and effective one for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. The combination with a truck mounted upon wheels, of a truck bolster traversing said truck and having its ends mounted on said truck outside the wheels thereof; and a car bolster mounted to be free to tilt, and having bearings on said truck bolster located within the mounting thereof, substantially as described.

2. The combination with a truck mounted upon wheels, of a truck bolster traversing said truck and having its ends pivotally mounted on said truck outside the wheels thereof; and a car bolster mounted to be free to tilt, and having bearings on said truck bolster located within the mounting thereof, substantially as described.

3. The combination with a truck mounted upon wheels, of a truck bolster traversing said truck and having its ends mounted on said truck outside of the wheels thereof; a car bolster mounted above said truck bolster and connected therewith to permit of tilting; and bearings for said car bolster on said truck bolster adjacent to but inside of the mounting of said truck bolster on said truck, substantially as described.

4. The combination with a truck mounted upon wheels, of a truck bolster traversing said truck and having its ends pivotally mounted on said truck outside of the wheels thereof; a car bolster mounted above said truck bolster and connected therewith to permit of tilting; and bearings for said car bolster on said truck bolster adjacent to but inside of the mounting of said truck bolster on said truck, substantially as described.

5. The combination with a truck mounted upon wheels, of a truck bolster traversing said truck and having its ends pivotally mounted on said truck outside of the wheels thereof; a car bolster arranged above on said truck bolster and operatively connected therewith to permit of tilting; open box-like housings secured to said truck bolster adjacent the ends thereof but inside of the mountings on the truck; and bearing blocks on said car bolster loosely resting within said housings, substantially as described.

In testimony whereof I have signed my name to this specification in the presence of two subscribing witnesses.

ELMYR A. LAUGHLIN.

Witnesses:
FREDA C. APPLETON,
MARGARET OWEN.